(12) United States Patent
Vijayvargiya et al.

(10) Patent No.: US 11,178,105 B2
(45) Date of Patent: Nov. 16, 2021

(54) SECURE ENCLAVE-BASED GUEST FIREWALL

(71) Applicant: VMWARE, INC., Palo Alto, CA (US)

(72) Inventors: Shirish Vijayvargiya, Pune (IN); Alok Nemchand Kataria, Prune (IN); Deep Shah, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 324 days.

(21) Appl. No.: 16/442,579

(22) Filed: Jun. 17, 2019

(65) Prior Publication Data

US 2020/0344210 A1 Oct. 29, 2020

(30) Foreign Application Priority Data

Apr. 26, 2019 (IN) .............................. 201941016706

(51) Int. Cl.
*H04L 29/06* (2006.01)
*G06F 9/455* (2018.01)

(52) U.S. Cl.
CPC ...... *H04L 63/0218* (2013.01); *G06F 9/45533* (2013.01); *H04L 63/0236* (2013.01); *H04L 63/0263* (2013.01); *H04L 63/1408* (2013.01); *H04L 63/164* (2013.01); *G06F 2009/45595* (2013.01)

(58) Field of Classification Search
CPC .............. H04L 63/0263; H04L 63/029; H04L 63/0227; H04L 63/0218
See application file for complete search history.

(56) References Cited

U.S. PATENT DOCUMENTS

| | | | | |
|---|---|---|---|---|
| 2009/0249472 A1* | 10/2009 | Litvin | ................. | H04L 63/0263 726/14 |
| 2016/0156591 A1* | 6/2016 | Zhou | ................... | H04L 63/0263 726/13 |
| 2018/0054351 A1* | 2/2018 | Bhandari | ............ | H04L 41/0604 |
| 2018/0183764 A1* | 6/2018 | Gunda | ...................... | G06F 9/06 |

* cited by examiner

*Primary Examiner* — Ellen Tran

(57) ABSTRACT

Techniques for implementing a secure enclave-based guest firewall are provided. In one set of embodiments, a host system can load a policy enforcer for a firewall into a secure enclave of a virtual machine (VM) running on the host system, where the secure enclave corresponds to a region of memory in the VM's guest memory address space that is inaccessible by processes running in other regions of the guest memory address space (including privileged processes that are part of the VM's guest operating system (OS) kernel). The policy enforcer can then, while running within the secure enclave: (1) obtain one or more security policies from a policy manager for the firewall, (2) determine that an event has occurred pertaining to a new or existing network connection between the VM and another machine, and (3) apply the one or more security policies to the network connection.

21 Claims, 6 Drawing Sheets

SECURE ENCLAVE-BASED GUEST FIREWALL

RELATED APPLICATIONS

Benefit is claimed under 35 U.S.C. 119(a)-(d) to Foreign Application Serial No. 201941016706 filed in India entitled "SECURE ENCLAVE-BASED GUEST FIREWALL", on Apr. 26, 2019, by VMware, Inc., which is herein incorporated in its entirety by reference for all purposes.

BACKGROUND

A distributed firewall is a network security mechanism that filters, using a set of predefined rules (i.e., security policies), network traffic flowing into and out of virtual machines (VMs) running on a host system. A distributed firewall typically includes two components: a policy manager implemented on a management server and a policy enforcer implemented within the host system hypervisor. The policy manager centrally manages the firewall's security policies and provides these policies to the policy enforcer, which enforces the policies at the hypervisor level with respect to incoming and outgoing VM network traffic.

Because the policy enforcer resides and runs in the hypervisor, the distributed firewall's policy enforcement logic is advantageously isolated from malicious code that may infect a given VM. However, this configuration also suffers from a number of drawbacks that limit the distributed firewall's efficiency and capabilities, particularly in scenarios where its security policies include ID-based policies (i.e., security policies that are defined based on user/group identities).

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to a secure enclave-based guest firewall—in other words, a firewall for filtering incoming and outgoing network traffic for a VM where the policy enforcement component of the firewall is implemented within a secure enclave of the VM. As used herein, a "secure enclave of a VM" is a region of memory in the VM's guest memory address space that is isolated from, and thus inaccessible by, all other processes running in the VM (including privileged processes like the VM's guest OS kernel). Thus, any code running in such a secure enclave cannot be compromised via attacks within the VM, including attacks that target the guest OS.

By implementing its policy enforcement logic at the VM rather than hypervisor level, the secure enclave-based guest firewall described herein mitigates or eliminates many of the drawbacks associated with conventional distributed firewalls. At the same time, because the secure enclave-based guest firewall's policy enforcement component is specifically placed within a secure enclave of the VM, this component is protected against potential attacks by other guest processes. These and other aspects of the present disclosure are described in further detail in the sections that follow.

2. System Architecture

Figure 1:
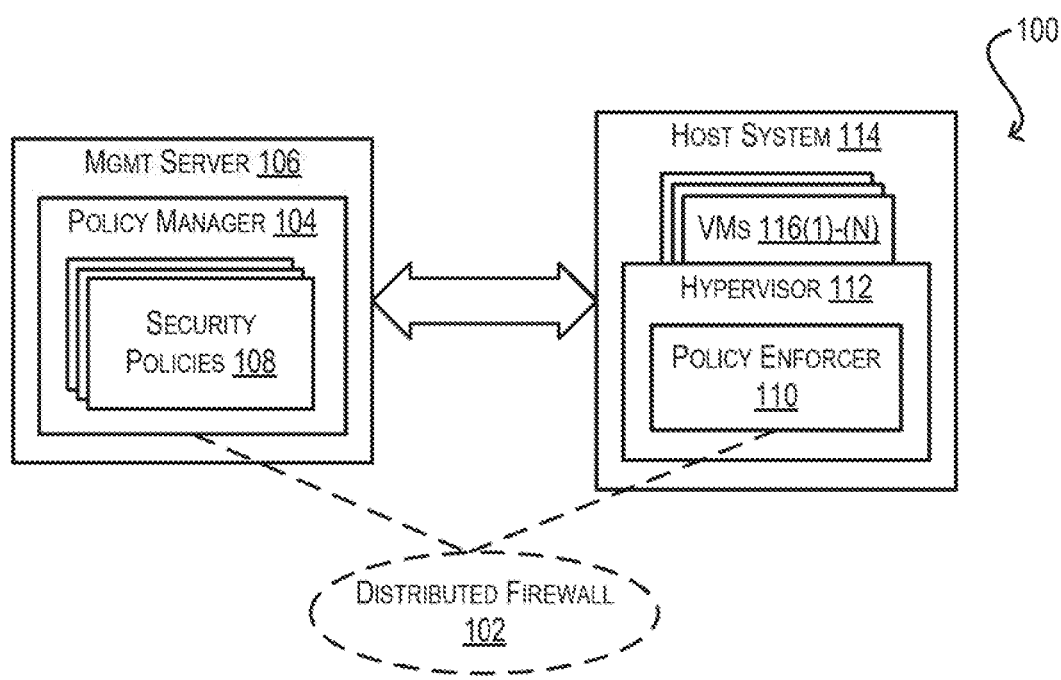
FIG. 1 depicts an architecture of a distributed firewall.

To provide context for the embodiments described herein, FIG. 1 is a simplified block diagram illustrating the architecture of a conventional distributed firewall 102 in an example operating environment 100. As shown, distributed firewall 102 includes a policy manager 104 running on a management server 106. Policy manager 104 is configured to maintain and facilitate the management (e.g., creation, update, deletion, etc.) of security policies 108 that are employed by distributed firewall 102 for filtering network traffic.

In one set of embodiments, security policies 108 can comprise Internet Protocol (IP) address-based policies that are defined with respect to IP addresses (and/or other parameters such as port and protocol) that are typically found in the Layer 3 header of a network packet. For example, in these embodiments security policies 108 can include a first policy indicating that all packets originating from (i.e., have a source IP address of) AAA.AAA.AAA.AAA should be allowed while all packets originating from BBB.BBB.BBB.BBB should be dropped.

In another set of embodiments, security policies 108 can comprise identity (ID)-based policies that are defined with respect to users that are, e.g., part of an organization that owns/operates operating environment 100. Such ID-based policies are typically based on "security IDs" (SIDs) that are derived from user/group names defined in a computer-implemented directory service for the organization (e.g., an LDAP-based service like Active Directory). For example, in these embodiments there may be a first policy indicating that traffic originating from a machine operated by SID "MarkL/Engineering" (corresponding to user Mark L. in the Engineering group) should be allowed while all traffic originating from machines operated by SIDs "*/Contractor" (corresponding to all users in the Contractor group) should be dropped. This allows for more precise and streamlined policy management in deployments where users and groups (rather than machines) are the primary endpoints for access control.

In addition to policy manager 104, distributed firewall 102 includes a policy enforcer 110 running within a hypervisor 112 of a host system 114. Policy enforcer 110 is configured to interoperate with policy manager 104 to enforce security policies 108 with respect to the network traffic of a number of VMs 116(1)-(N) running on top of hypervisor 112 of host system 114. For example, in the case where security policies 108 include IP-based policies, at the time a new connection is established between a VM 116 and a remote machine, policy enforcer 110 will typically receive one or more security policies from policy manager 104 pertaining to the IP addresses of these machines. Policy enforcer 110 will then apply these policies to the network packets flowing between the machines and take an appropriate action on each packet (e.g., allow or drop it).

As another example, in the case where security policies 108 comprise ID-based policies, at the time a new connection is established between a VM 116 and a remote machine, information regarding the currently logged-in user on VM 116 will typically be sent to policy manager 104. In response, policy manager 104 will identify the security policies pertaining to the user's SID, map the SID to the IP address of VM 116, convert the ID-based policies into IP-based policies using the IP address of VM 116, and forward these IP-based policies to policy enforcer 110. Policy enforcer 110 will then enforce the received policies on subsequent packet send or receive events on the connection. Note that policy manager 104 converts the ID-based polices into IP-based policies for policy enforcer 110 because policy enforcer 110 does not have visibility into the user associated with a given incoming or outgoing packet; policy enforcer 110 can only examine the packet header comprising the packet's source IP address, destination IP address, source port, destination port, and protocol, and thus can only enforce IP-based policies using this information.

As noted in the Background section, while the distributed firewall configuration shown in FIG. 1 advantageously isolates policy enforcer 110 from malicious VM-level code by placing this component within hypervisor 112 rather than within each VM 116, this configuration also suffers from a number of drawbacks. First, for outgoing encrypted network traffic such as HTTPS (Hyper Text Transfer Protocol Secure) traffic, because policy enforcer 110 sits outside of the scope of the VM where that traffic originates, policy enforcer 110 must decrypt each encrypted packet to determine its packet header information (e.g., source IP address, destination IP address, etc.) and apply security policies 108. Once the appropriate policies are applied, the packet is either dropped or the encrypted version is forwarded onward to its intended destination. This process of decrypting every encrypted network packet solely for policy enforcement purposes is redundant and inefficient.

Second, in scenarios where a VM 116 is live migrated from host system 114 to another (destination) host system, there will typically be some lag time before the policy enforcer residing in the hypervisor of the destination host system has retrieved the appropriate security policies from policy manager 104 and is ready to enforce those policies against the network traffic flowing into or out of the migrated VM. This lag time can provide a short window of opportunity for malicious entities to perpetrate a network-based attack.

Third, because policy enforcer 110 acts as a centralized enforcement mechanism for all of the VMs 116(1)-(N) running on hypervisor 112, performance/bottlenecking issues may arise if multiple VMs require the services of policy enforcer 110 at substantially the same time.

Fourth, due to the manner in which policy manager 104 converts ID-based policies into IP-based policies for policy enforcer 110 (which stems from the policy enforcer's inability to determine the user associated with a given network packet), policy enforcer 110 cannot correctly enforce ID-based policies for the network traffic of a multi-user VM (i.e., a VM where multiple users may be logged in at the same time). For example, in the scenario where user A logs into VM 116 and establishes a first network connection N1 to a given destination D and user B logs into the same VM 116 and establishes a second network connection N2 to the same destination D, policy enforcer 110 will only enforce a single security policy (pertaining to the IP addresses of VM 116 and destination D) against the traffic for connections N1 and N2, even if users A and B are associated with different ID-based policies. This is because users A and B are both mapped to the same source IP address (of VM 116) at the level of policy manager 104.

Fifth, since security policies are fetched by policy enforcer 110 from policy manager 104 on every connection request, the connection is necessarily stalled/blocked while the policies are transferred to policy enforcer 110. This undesirably increases the latency of setting up the connection.

Figure 2:
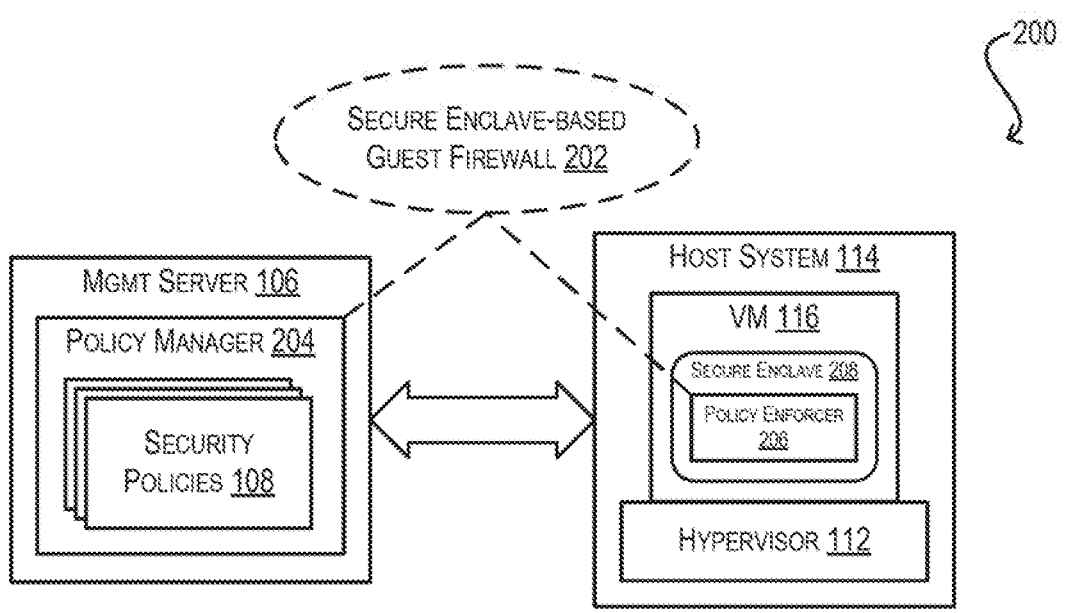
FIG. 2 depicts an architecture of a secure enclave-based guest firewall according to certain embodiments.

To address the foregoing and other issues, FIG. 2 depicts an operating environment 200 comprising a secure enclave-based guest firewall 202 according to certain embodiments. Secure enclave-based guest firewall 202 includes a policy manager 204 and a policy enforcer 206 that are, at a high level, functionally similar to components 104 and 110 of distributed firewall 102. However, as shown in FIG. 2, policy enforcer 206 of secure enclave-based guest firewall 202 is configured to run within a secure enclave 208 of VM 116 (i.e., the machine being protected by firewall 202), rather than as part of hypervisor 112.

As mentioned previously, a secure enclave (also sometimes referred to as a "trusted execution environment" or TEE) of a VM is an isolated region of memory in the VM's guest memory address space that cannot be accessed by the VM's guest OS or other VM-level processes outside of the secure enclave. In various embodiments, this secure enclave can be established via software (e.g., a hypervisor-based enclave technology), via hardware (e.g., a CPU-based enclave technology such as Intel SGX or ARM TrustZone), or via a combination thereof.

Because policy enforcer 206 of firewall 202 is placed within secure enclave 208, policy enforcer 206 is protected against potential attacks in VM 116 that attempt to subvert the enforcer's operation. Thus, secure enclave-based guest firewall 202 offers a similar level of security for its policy enforcement component as distributed firewall 102 of FIG. 1. Additionally, by moving policy enforcement from the hypervisor level to the VM level, secure enclave-based guest firewall 202 addresses many of the disadvantages of distributed firewall 102.

For example, since policy enforcer 206 can run at the application layer (Layer 7) of the network stack of the VM's guest OS, policy enforcer 206 can apply security policies to outgoing network traffic such as HTTPS before it is encrypted at the protocol layer. This avoids the need to redundantly decrypt already encrypted packets for policy enforcement purposes.

Further, in the scenario where VM 116 is live migrated from host system 114 to another host system, there is no downtime for enforcing the security policies that apply to the VM after the migration event. This is because policy enforcer 206 (and the security policies it has received from policy manager 204) are migrated along with the VM itself to the destination host system, and thus is immediately available at the destination host system to continue its enforcement duties.

Further, since a separate instance of policy enforcer 206 is implemented within every VM, there is no single point of failure or bottleneck for policy enforcement as in the case of hypervisor-level policy enforcer 110 of distributed firewall 102.

Yet further, because policy enforcer 206 runs in the guest context, policy enforcer 206 has access to per-packet user information and can use this for enforcement, thereby enabling multi-user VM support with respect to ID-based policies. For example, at the time a network packet is sent or received by VM 116, policy enforcer 206 can determine the logged-in user that is associated with the connection on which the packet is sent/received and can leverage this user information to apply an appropriate ID-based policy to that specific packet.

The remainder of this disclosure describes workflows that may be executed by policy manager 204 and policy enforcer 206 for enforcing ID-based policies and IP-based policies respectively against the network traffic of VM 116. It should be appreciated that the firewall architecture shown in FIG. 2 is illustrative and not intended to limit embodiments of the present disclosure. For example, although only a single VM 116 is depicted in FIG. 2 for simplicity, in various embodiments multiple VMs may be supported. In these embodiments, each VM can include its own instance of policy enforcer 206 within its own secure enclave 208.

Further, although FIG. 2 and other portions of this disclosure focus on the protection of virtual machines via secure enclave-based guest firewall 202, the same concepts may be used to protect physical machines. For instance, in certain embodiments VM 116 of FIG. 2 may be replaced with a physical computer system and policy enforcer 206 may be implemented within a secure enclave established on that physical system. In these embodiments, the secure enclave may be an enclave that enabled via a hardware-based enclave technology such as SGX, TrustZone, etc.

3. ID-Based Policy Enforcement

Figure 3A:
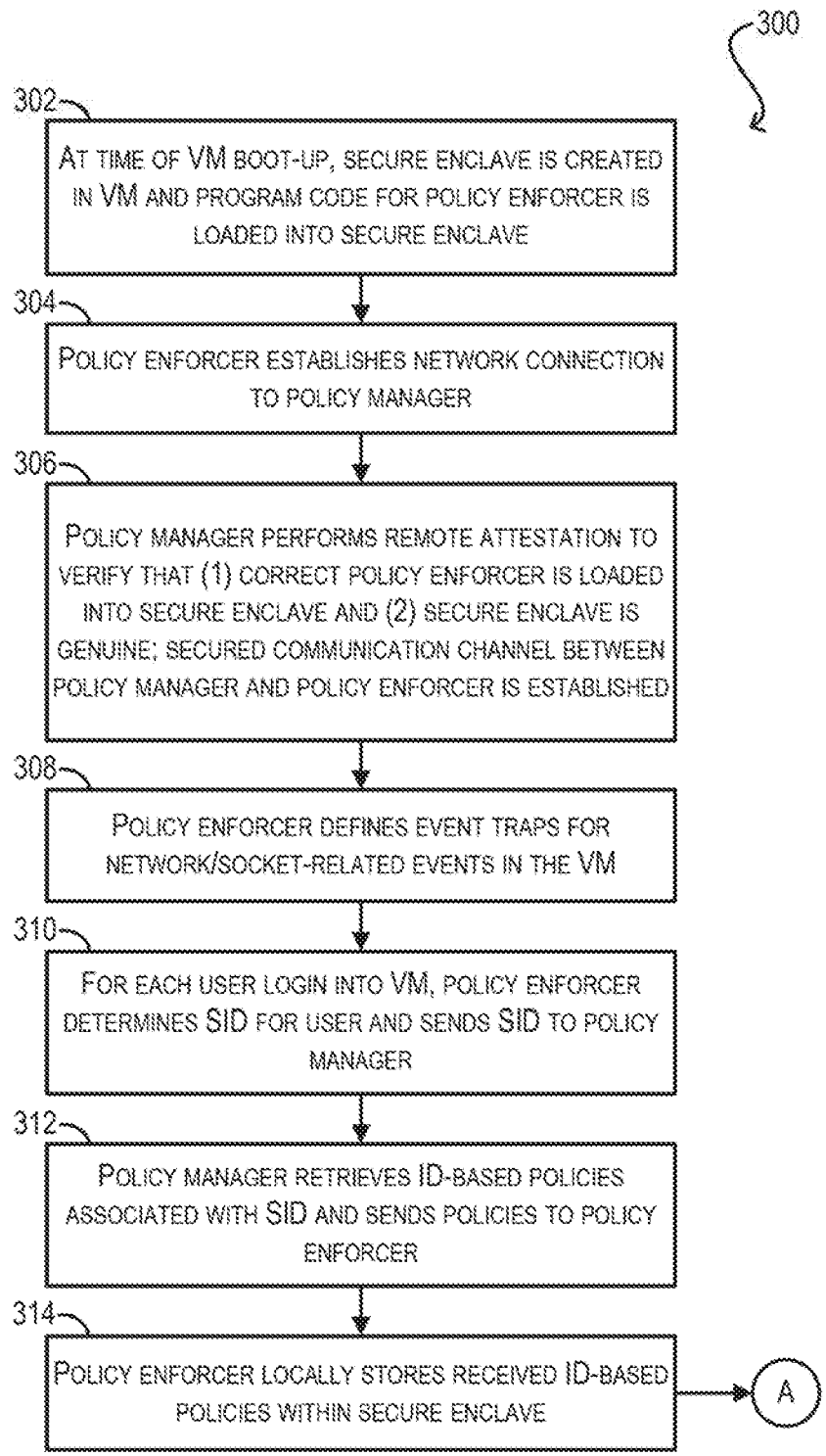
FIGS. 3A and 3B depict a workflow performed by the secure enclave-based guest firewall of FIG. 2 for enforcing ID-based security policies according to certain embodiments.
Figure 3B:
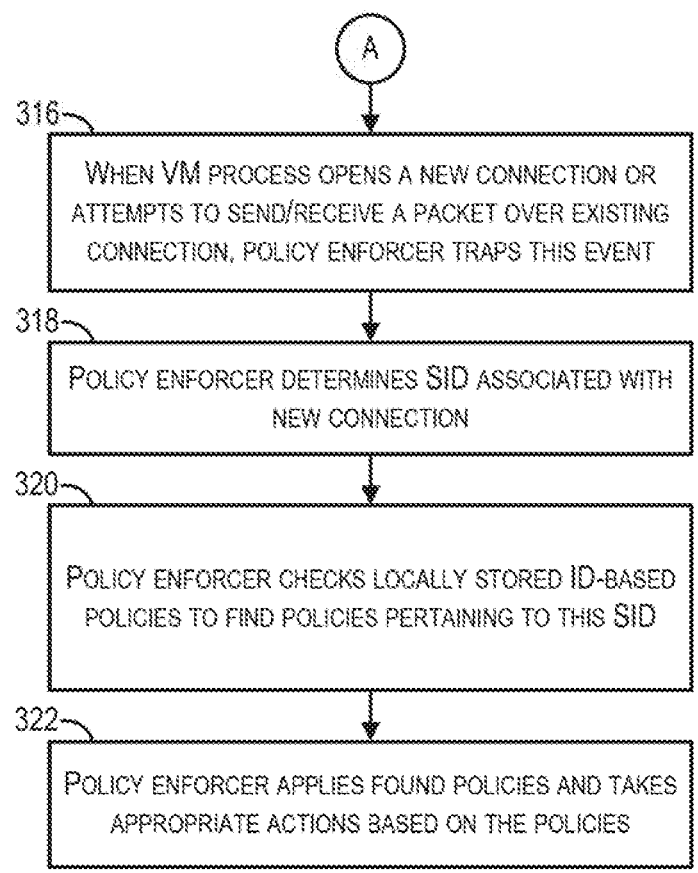

FIGS. 3A and 3B depict a workflow 300 can be executed by policy manager 204 and policy enforcer 206 of FIG. 2 for enforcing ID-based policies against the network traffic of VM 116 according to certain embodiments. This workflow assumes that the VM-level secure enclave in which policy enforcer 206 resides and runs (i.e., secure enclave 208) supports a synchronous event trapping mechanism that can (1) detect the occurrence of a guest OS-level L7 network events such as socket create, socket bind, socket listen, and/or socket connect and (2) upon the detection of such an event, redirect control to a predefined entry point within secure enclave 208 (e.g., a particular memory address containing appropriate event handling code of policy enforcer 206).

Starting with block 302 of FIG. 3A, at the time of boot-up of VM 116, secure enclave 208 can be created within the VM and the program code for policy enforcer 206 can be loaded into secure enclave 208. This step can be performed by, e.g., the guest OS of VM 116 or some other user-level process that is associated with firewall 200.

At blocks 304 and 306, policy enforcer 206 (which is now running within secure enclave 208) can establish a network connection to policy manager 204 and in response, policy manager 206 can carry out a remote attestation of policy enforcer 206. Generally speaking, the manner in which this remote attestation is performed will vary depending on the software or hardware technology used to establish secure enclave 208. For example, SGX may provide one method for carrying out remote attestation while TrustZone may provide a different method. However, regardless of the implementation details, the end result of this remote attestation procedure is that policy manager 204 can verify that (1) the correct/expected version of policy enforcer 206 is loaded into secure enclave 208, and (2) secure enclave 208 is, in fact, a genuine (rather than faked) secure enclave. As part of carrying out the remote attestation at block 306, policy manager 204 can establish a secured communication channel with policy enforcer 206 (e.g., a TLS connection) for further communication.

Assuming that the remote attestation at block 306 is successful, policy enforcer 206 can set up event traps for L7 networking events pertaining to its policy enforcement (e.g., socket create, socket bind, socket listen, socket connect, etc.) using the enclave-based event trapping mechanism noted above (block 308).

Further, each time a user logs into VM 116, policy enforcer 206 can determine the SID for the user (based on, e.g., the user's user name and group name) and send this SID to policy manager 204 over the secured communication channel (block 310). In response, policy manager 204 can retrieve the ID-based security policies 108 associated with the SID and send the retrieved policies to policy enforcer 206 over the secured communication channel (block 312), and policy enforcer 206 can locally store the policies within secure enclave 208 (block 314).

Turning now to FIG. 3B, when a process within VM 116 opens a new connection or takes an action for communicating with another machine via an existing network connection, policy enforcer 206 can trap the event per the previously-configured event traps (block 316), determine the user/SID associated with the connection (block 318), and check its locally stored ID-based security policies to find any policies that apply to the determined user/SID (block 320). Finally, assuming one or more such policies are found, policy enforcer 206 can apply those polices (block 322). For example, in the case where a new connection is attempted, policy enforcer 206 can allow or deny the connection attempt based on the outcomes of the applied polices. As another example, in the case where a packet is attempted to be sent or received over an existing network connection, policy enforcer 206 can block or allow the packet based on the outcomes of the applied policies.

It should be appreciated that workflow 300 is illustrative and various modifications are possible. For example, although workflow 300 is depicted as being linear with a defined start and end, various portions of this workflow can be repeated, performed out of order, and/or executed concurrently with other portions as needed. For instance, the policy retrieval performed at blocks 310-314 can be performed asynchronously and potentially concurrently with the event handling steps at blocks 316-322.

In addition, in certain embodiments secure enclave 208 may have a limited amount of space for storing the policies of users logged into VM 116. If many users are logged in at the same time, secure enclave 208 may not have enough space to locally store the policies for all of these users. Thus, in these scenarios policy enforcer 206 may implement one or more techniques for intelligently managing the ID-based policies that are maintained within secure enclave 208. These techniques can include, e.g., aging-out the policies of users that have been in the enclave for some threshold amount of time, prioritizing the local storage of certain users' policies over others based on user-defined priority indicators, etc. One of ordinary skill in the art will recognize other variations and alternatives.

4. IP-Based Policy Enforcement

Figure 4A:
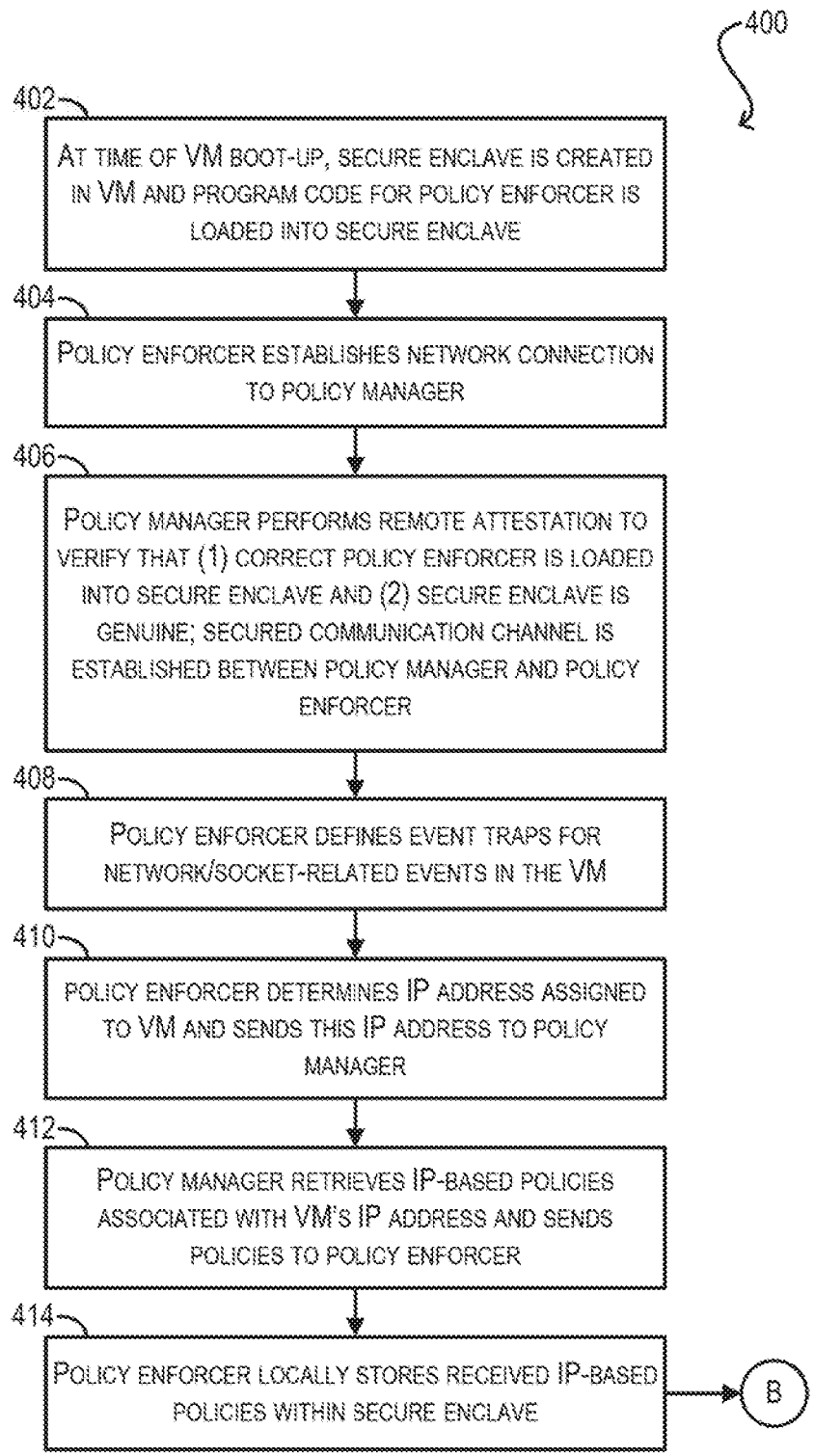
FIGS. 4A and 4B depict a workflow performed by the secure enclave-based guest firewall of FIG. 2 for enforcing IP-based security policies according to certain embodiments.
Figure 4B:
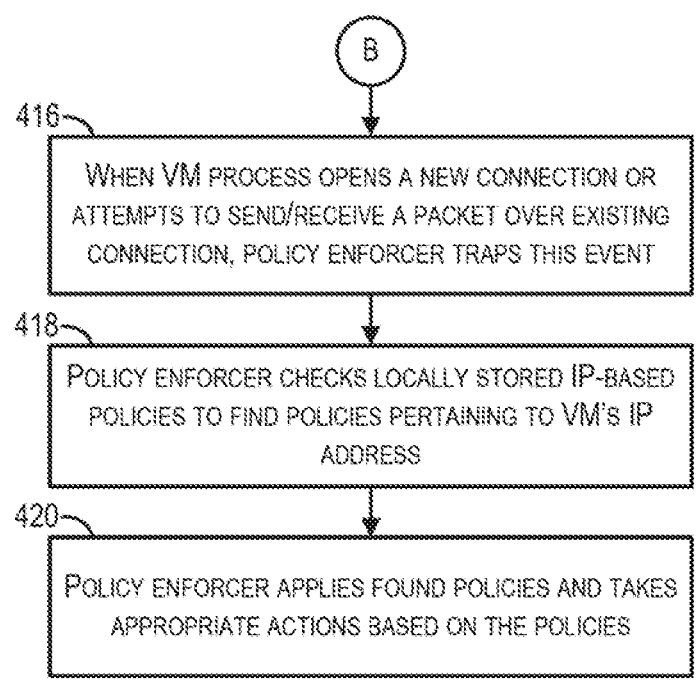

FIGS. 4A and 4B depict a workflow 400 can be executed by policy manager 204 and policy enforcer 206 of FIG. 2 for enforcing IP-based policies against the network traffic of VM 116 according to certain embodiments. Like workflow 300, this workflow assumes that secure enclave 208 supports a synchronous event trapping mechanism that can be leveraged by policy enforcer 206 to detect the occurrence of guest OS-level L7 network events and invoke appropriate code for enforcing security policies against those events.

Blocks 402-408 of FIG. 4A are largely similar to blocks 302-308 of FIG. 3A. In particular, at block 402, secure enclave 208 can be created within VM 116 at the time of VM boot-up and the program code for policy enforcer 206 can be loaded into secure enclave 208. Further, policy enforcer 206 (which is now running within secure enclave 208) can establish a network connection to policy manager 204 (block 404) and in response, policy manager 204 can carry out a remote attestation of policy enforcer 206, which includes establishing a secured communication channel to policy enforcer 206 for further communication (block 406). Assuming that the remote attestation is successful, policy enforcer 206 can set up event traps for L7 networking events pertaining to its policy enforcement (e.g., socket create, socket bind, socket listen, socket connect, etc.) using the enclave-based event trapping mechanism noted above (block 408).

At block 410, policy enforcer 206 can determine the IP address assigned to VM 116 and send the IP address to policy manager 204 over the secured communication channel. In response, policy manager 204 can retrieve the IP-based security policies 108 associated with the VM's IP address and send the retrieved policies to policy enforcer 206 over the secured communication channel (block 412), and policy enforcer 206 can locally store the policies within secure enclave 208 (block 414).

Then, when a process within VM 116 opens a new connection or takes an action for communicating with another machine via an existing network connection, policy enforcer 206 can trap the event per the previously-configured event traps (block 416) and check its locally stored IP-based security policies to find any policies that apply to the VM's IP address (block 418). Finally, assuming one or more such policies are found, policy enforcer 206 can apply the found polices (block 420). For example, in the case where a new connection is attempted, policy enforcer 206 can allow or deny the connection attempt based on the outcomes of the applied polices. As another example, in the case where a packet is attempted to be sent or received over an existing network connection, policy enforcer 206 can block or allow the packet based on the outcomes of the applied policies.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing a secure enclave-based guest firewall, the method comprising:
    loading, by a host system, a policy enforcer for a firewall into a secure enclave of a virtual machine (VM) running on the host system, the secure enclave corresponding to a region of memory in a guest memory address space of the VM that is inaccessible by processes running in other regions of the guest memory address space, the processes including privileged processes that are part of a guest operating system (OS) kernel of the VM;
    performing, by a policy manager for the firewall, a remote attestation of the policy enforcer to verify that the policy enforcer is loaded into the secure enclave and that the secure enclave is genuine;

obtaining, by the policy enforcer while running within the secure enclave, one or more security policies from the policy manager for the firewall;

determining, by the policy enforcer while running within the secure enclave, that an event has occurred pertaining to a new or existing network connection between the VM and another machine; and in response to the determining, applying, by the policy enforcer while running within the secure enclave, the one or more security policies to the new or existing network connection.

2. The method of claim 1 wherein the secure enclave is created in the VM using a hypervisor-based enclave technology.

3. The method of claim 1 wherein obtaining the one or more security policies from the policy manager comprises:

transmitting, to the policy manager over a secured communication channel, an IP (Internet Protocol) address of the VM; and receiving, from the policy manager over the secured communication channel, one or more IP address-based security policies associated with the IP address of the VM.

4. The method of claim 1 wherein obtaining the one or more security policies from the policy manager comprises, each time a user logs into the VM:

determining a security identifier (ID) associated with the user, the security ID being based on a user name and a group name for the user defined in a directory service;

transmitting, to the policy manager over a secured communication channel, the security ID; and receiving, from the policy manager over the secured communication channel, one or more ID-based policies associated with the security ID.

5. The method of claim 4 wherein applying the one or more security policies comprises:

determining another security ID for a user associated with the new or existing network connection; and finding, from among the one or more ID-based policies received from the policy manager, at least one ID-based policy pertaining to said another security ID; and applying the at least one ID-based policy.

6. The method of claim 1 wherein the one or more security policies are stored within the secure enclave.

7. The method of claim 1 wherein determining that an event has occurred pertaining to a new or existing network connection between the VM and another machine comprises:

trapping, by the policy enforcer, the event via a synchronous event trapping mechanism supported by the secure enclave.

8. A non-transitory computer readable storage medium having stored thereon program code executable by a host system for implementing a secure enclave-based guest firewall, the method comprising:

loading a policy enforcer for a firewall into a secure enclave of a virtual machine (VM) running on the host system, the secure enclave corresponding to a region of memory in a guest memory address space of the VM that is inaccessible by processes running in other regions of the guest memory address space, the processes including privileged processes that are part of a guest operating system (OS) kernel of the VM;

performing, by a policy manager for the firewall, a remote attestation of the policy enforcer to verify that the policy enforcer is loaded into the secure enclave and that the secure enclave is genuine;

obtaining, by the policy enforcer while running within the secure enclave, one or more security policies from the policy manager for the firewall;

determining, by the policy enforcer while running within the secure enclave, that an event has occurred pertaining to a new or existing network connection between the VM and another machine; and in response to the determining, applying, by the policy enforcer while running within the secure enclave, the one or more security policies to the new or existing network connection.

9. The non-transitory computer readable storage medium of claim 8 wherein the secure enclave is created in the VM using a hypervisor-based enclave technology.

10. The non-transitory computer readable storage medium of claim 8 wherein obtaining the one or more security policies from the policy manager comprises:

transmitting, to the policy manager over a secured communication channel, an IP (Internet Protocol) address of the VM; and receiving, from the policy manager over the secured communication channel, one or more IP address-based security policies associated with the IP address of the VM.

11. The non-transitory computer readable storage medium of claim 8 wherein obtaining the one or more security policies from the policy manager comprises, each time a user logs into the VM:

determining a security identifier (ID) associated with the user, the security ID being based on a user name and a group name for the user defined in a directory service;

transmitting, to the policy manager over a secured communication channel, the security ID; and receiving, from the policy manager over the secured communication channel, one or more ID-based policies associated with the security ID.

12. The non-transitory computer readable storage medium of claim 11 wherein applying the one or more security policies comprises:

determining another security ID for a user associated with the new or existing network connection; and finding, from among the one or more ID-based policies received from the policy manager, at least one ID-based policy pertaining to said another security ID; and applying the at least one ID-based policy.

13. The non-transitory computer readable storage medium of claim 8 wherein the one or more security policies are stored within the secure enclave.

14. The non-transitory computer readable storage medium of claim 8 wherein determining that an event has occurred pertaining to the new or existing network connection between the VM and another machine comprises:

trapping, by the policy enforcer, the event via a synchronous event trapping mechanism supported by the secure enclave.

15. A host system comprising:

a processor; and a non-transitory computer readable medium having stored thereon program code for implementing a secure enclave-based guest firewall for a virtual machine (VM) running on the host system, the program code causing the host system to:

load a policy enforcer for a firewall into a secure enclave of the VM, the secure enclave corresponding to a region of memory in a guest memory address space of the VM that is inaccessible by processes running in other regions of the guest memory address space, the processes including privileged processes that are part of a guest operating system (OS) kernel of the VM;

perform, by a policy manager for the firewall, a remote attestation of the policy enforcer to verify that the policy enforcer is loaded into the secure enclave and that the secure enclave is genuine;

obtain, via the policy enforcer while running within the secure enclave, one or more security policies from the policy manager for the firewall;

determine, via the policy enforcer while running within the secure enclave, that an event has occurred pertaining to a new or existing network connection between the VM and another machine; and in response to the determining, apply, via the policy enforcer while running within the secure enclave, the one or more security policies to the new or existing network connection.

16. The host system of claim 15 wherein the secure enclave is created in the VM using a hypervisor-based enclave technology.

17. The host system of claim 15 wherein the program code that causes the policy enforcer to obtain the one or more security policies from the policy manager comprises program code that causes the policy enforcer to:

transmit, to the policy manager over a secured communication channel, an IP (Internet Protocol) address of the VM; and receive, from the policy manager over the secured communication channel, one or more IP address-based security policies associated with the IP address of the VM.

18. The host system of claim 15 wherein the program code that causes the policy enforcer to obtain the one or more security policies from the policy manager comprises program code that causes the policy enforcer to, each time a user logs into the VM:

determine a security identifier (ID) associated with the user, the security ID being based on a user name and a group name for the user defined in a directory service;

transmit, to the policy manager over a secured communication channel, the security ID; and receive, from the policy manager over the secured communication channel, one or more ID-based policies associated with the security ID.

19. The host system of claim 18 wherein the program code that causes the policy enforcer to apply the one or more security policies comprises program code that causes the policy enforcer to:

determine another security ID for a user associated with the new or existing network connection; and find, from among the one or more ID-based policies received from the policy manager, at least one ID-based policy pertaining to said another security ID; and apply the at least one ID-based policy.

20. The host system of claim 15 wherein the one or more security policies are stored within the secure enclave.

21. The host system of claim 15 wherein the program code that causes the policy enforcer to determine that an event has occurred pertaining to the new or existing network connection between the VM and another machine comprises program code that causes the policy enforcer to:

trap the event via a synchronous event trapping mechanism supported by the secure enclave.

* * * * *